Patented Jan. 2, 1945

2,366,255

UNITED STATES PATENT OFFICE 2,366,255

METHOD OF MANUFACTURING LEAD SILICATE

Raymond L. Hallows and Floyd B. Barrett, Joplin, Mo., assignors to The Eagle-Picher Lead Company, Cincinnati, Ohio, a corporation of Ohio No Drawing. Application July 7, 1941, Serial No. 401,334

1 Claim. (Cl. 23—110)

Our invention relates to lead silicate and a method of preparing same whereby we may regulate the color of the finished product and vary the same effectively to produce a lead silicate with a color range suitable for the production of glass ware and ceramic products.

In the manufacture of lead silicate, a lead bearing material is admixed with silica in varying percentages and the whole brought to fusion in a reverberatory furnace at a temperature varying from approximately 1400° F. to 2200° F. The lead bearing materials may comprise lead oxide, leady litharge, and lead carbonate, which will hereafter be referred to in the specification and claims as lead material.

During the process of fusion certain types of discoloring matter are formed by the reducing action of any metallic lead present, or by the reducing action of the products of combustion in the furnace which deleteriously affect the color of the product. In carrying out our process we have found that the color of the lead silicate may be definitely controlled by the addition of small amounts of an oxidizing agent, such as the nitrates and chlorates of the alkalies, including sodium, potassium and ammonium nitrates and chlorates, to the furnace charge. In this manner the color of the lead silicate may be varied from dark brown, to water white, to green, depending on the amount of oxidizing agent added to the other ingredients in the furnace charge.

The amount of oxidizing agent necessary to affect control of color may be said to depend upon the components of the furnace charge, the quantities thereof, the nature of the materials in contact with the molten lead silicate, and the atmosphere in the furnace. Our process is equally effective to control the color of lead metasilicate, lead orthosilicate, tetralead silicate or mixtures thereof.

Example I

As an example of the method employed by us in carrying out our process, we prepared a mixture composed of 1275 pounds of litharge analyzing 0.9 per cent metallic lead, 0.002 per cent copper, 0.002 per cent iron and 0.05 per cent silica, 0.1 ounce per ton silver and virtually free of arsenic, antimony, tin, bismuth, and zinc, together with 225 pounds of glass sand analyzing 0.06 per cent iron oxide, 0.25 per cent alumina, 0.05 per cent calcium carbonate, 0.01 per cent magnesia and 99.5 per cent silica. This was charged to a reverberatory furnace operating at about 1625° F. and treated for one hour at which time the reaction was complete. The resulting product was lead silicate that was dark yellow in color, composed of 84.8 per cent lead oxide, 14.8 per cent silica in chemical combination and containing 0.025 per cent iron, 0.0019 per cent copper, 0.05 per cent alumina and a trace of silver, calcium and magnesium salts.

Example II

A charge composed of the same litharge and silica in the same amounts as given in Example I, together with the addition of 5 pounds of sodium nitrate intimately admixed therewith was fused in the reverberatory furnace at 1590° F. for approximately one hour and five minutes at which time the reaction was complete. The resulting product was lead silicate that was light straw colored, composed of 84.75 per cent lead oxide, and 14.8 per cent silica in chemical combination containing 0.025 per cent iron, 0.0019 per cent copper, 0.05 per cent alumina, a trace of silver, calcium and magnesium salts and 0.2 per cent sodium oxide.

Example III

A charge composed of the same litharge and silica in the same amounts as given in Example I, together with the addition of 10 pounds of sodium nitrate intimately admixed therewith, was fused in the reverberatory furnace at a temperature of 1640° F. for one hour and fifteen minutes at which time the reaction was complete. This produced a lead silicate that was water white in color, composed of 84.6 per cent lead oxide, 14.7 per cent silica in chemical combination and containing 0.024 per cent iron, 0.002 per cent copper, 0.04 per cent alumina, a trace of silver, calcium and magnesium salts and 0.3 per cent sodium oxide.

Example IV

A mixture of 1275 pounds of the litharge, and 225 pounds of the sand, given in Example I, was intimately admixed with 20 pounds of sodium nitrate and fused for one hour and ten minutes at 1645° F. in a reverberatory furnace, at which time the reaction was complete. The resulting product was lead silicate in chemical combination that was light green in color and contained 0.022 per cent iron, 0.002 per cent copper, 0.04 per cent alumina, a trace of silver, calcium, and magnesium salts and 0.6 per cent sodium oxide.

Example V

A mixture of 1275 pounds of litharge containing 0.8 per cent metallic lead, 0.003 per cent iron, 0.02 per cent silica, 0.08 ounce per ton silver, 0.004 per cent copper and virtually free of arsenic, antimony, tin, zinc and bismuth, and 225 pounds of glass sand containing 0.04 per cent iron oxide, 0.15 per cent alumina, 0.07 per cent calcium carbonate, 0.01 per cent magnesia and 99.6 per cent silica was admixed with 10 pounds of ammonium nitrate and fused in a reverberatory furnace at 1625° F. for one hour and twenty minutes, at which time the reaction was complete. The resulting product was a lead silicate that was water white in color, composed of 84.85 per cent lead oxide and 14.9 per cent silica in chemical combination and containing 0.015 per cent iron, 0.003 per cent copper, 0.05 ounce per ton of silver, 0.01 per cent alumina, traces of calcium and magnesium salts, and free of ammonium salts.

Example VI

A charge composed of the same litharge and silica, in the same amounts as given in Example V, was admixed with 10 pounds of potassium nitrate and fused in a reverberatory furnace at 1640° F. for one hour, at which time the reaction was complete. The resulting product was lead silicate that was water white in color, composed of 84.4 per cent lead oxide and 14.6 per cent silica in chemical combination and contained 0.016 per cent iron, 0.003 per cent copper, 0.01 per cent alumina, and 0.4 per cent potassium oxide, 0.05 ounces per ton of silver, traces of calcium and magnesium salts, and 0.4% potassium oxide.

Example VII

A mixture of 1275 pounds of litharge containing 0.8 per cent metallic lead, 0.003 per cent iron, 0.02 per cent silica, 0.08 ounce per ton silver, 0.004 per cent copper and virtually free of arsenic, antimony, tin, zinc and bismuth, and 225 pounds of glass sand containing 0.04 per cent iron oxide, 0.15 per cent calcium carbonate, 0.01 per cent magnesia and 99.6 per cent silica was admixed with 10 pounds of sodium chlorate and fused in a reverberatory furnace at 1625° F. for one hour and 20 minutes at which time the reaction was complete. The resulting product was a lead silicate that was water white in color, composed of 84.85 per cent lead oxide and 14.9 per cent silica in chemical combination and containing 0.015 per cent iron, 0.003 per cent copper, 0.05 ounce per ton of silver, 0.01 per cent alumina, a trace of magnesium salts and 0.25 per cent sodium oxide.

Having thus disclosed our invention what we claim is:

The method of producing a lead silicate green in color which comprises fusing silica and a member selected from the group consisting of lead oxide, lead carbonate and litharge in amounts sufficient to form a lead silicate with an oxidizing agent selected from the group consisting of alkali and ammonium chlorates and nitrates, the agent being in an amount greater than will produce a water-white product and sufficient to cause formation of a green coloration.

RAYMOND L. HALLOWS.
FLOYD B. BARRETT.